United States Patent [19]

Haneishi

[11] Patent Number: 4,653,889
[45] Date of Patent: Mar. 31, 1987

[54] ELECTRIC CONTACT ARRANGEMENT FOR INDIVIDUAL OBJECTIVES

[75] Inventor: Yasuyuki Haneishi, Itabashi, Japan

[73] Assignee: Asahi Kogaku Kogyo Kabushiki Kaisha, Tokyo, Japan

[21] Appl. No.: 734,895

[22] Filed: May 16, 1985

[30] Foreign Application Priority Data

May 18, 1984 [JP] Japan .................. 59-101544

[51] Int. Cl.⁴ ............................................ G03B 17/00
[52] U.S. Cl. ................................................ 354/286
[58] Field of Search .................................. 354/21, 286

[56] References Cited

U.S. PATENT DOCUMENTS

| | | | |
|---|---|---|---|
| 4,357,089 | 11/1982 | Okura et al. | 354/286 |
| 4,372,663 | 2/1983 | Oshima | 354/286 |
| 4,417,798 | 11/1983 | Ohkura et al. | 354/286 |
| 4,420,239 | 12/1983 | Yasuyuki et al. | 354/286 |
| 4,448,509 | 5/1984 | Katsuma et al. | 354/286 |
| 4,457,608 | 7/1984 | Komoto et al. | 354/286 |
| 4,469,422 | 9/1984 | Kimura et al. | 354/286 |
| 4,582,408 | 4/1986 | Miki et al. | 354/21 |

FOREIGN PATENT DOCUMENTS 2070264 9/1981 United Kingdom ............... 354/286
2158957 11/1985 United Kingdom ............... 354/286

*Primary Examiner*—Russell E. Adams
*Attorney, Agent, or Firm*—Christie, Parker & Hale

[57] ABSTRACT

A lens for a photographic camera adapted to be mounted on a camera body, has a lens barrel, a lens mount secured on the lens barrel, and at least one contact for transmitting information to the camera body. The contact has first and second contiguous portions independently movable into and out of the lens mount. A first spring urges the first portion of the contact out of the lens mount. A second spring independent of the first spring urges the second portion of the contact out of the lens mount. Preferably, the first portion of the contact is a hollow cylinder, the second portion of the contact fits in the hollow of the first portion, and the ends of the first and second portions facing away from the lens mount are both convex and smoothly continuous at their convex ends.

15 Claims, 7 Drawing Figures

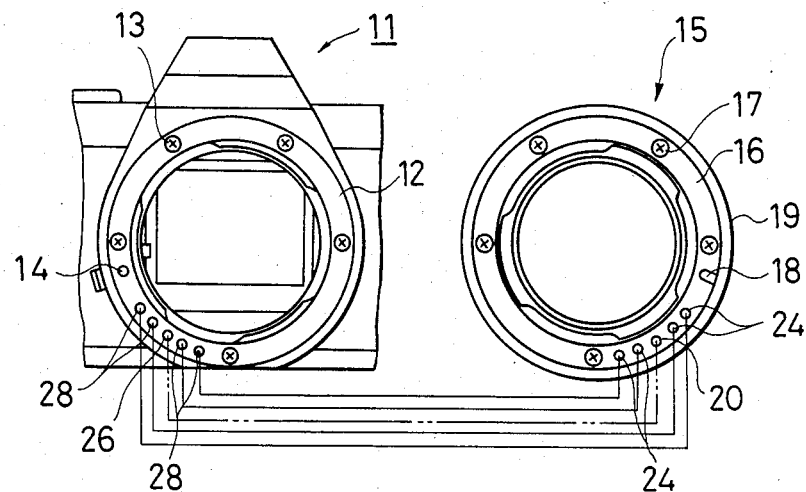
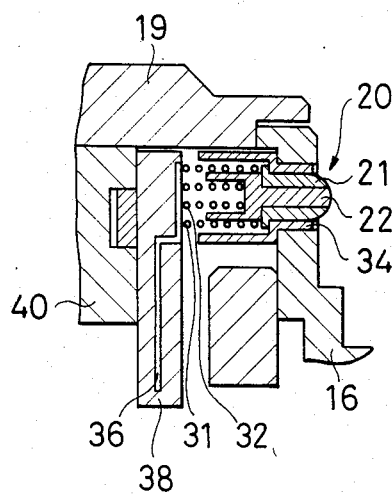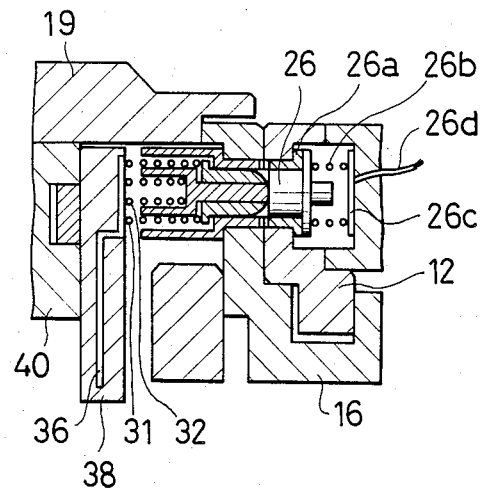

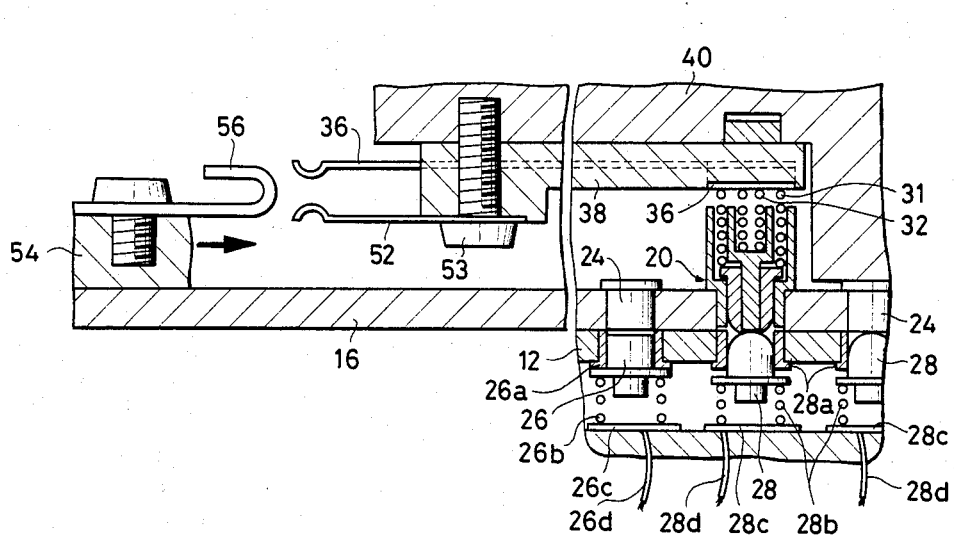
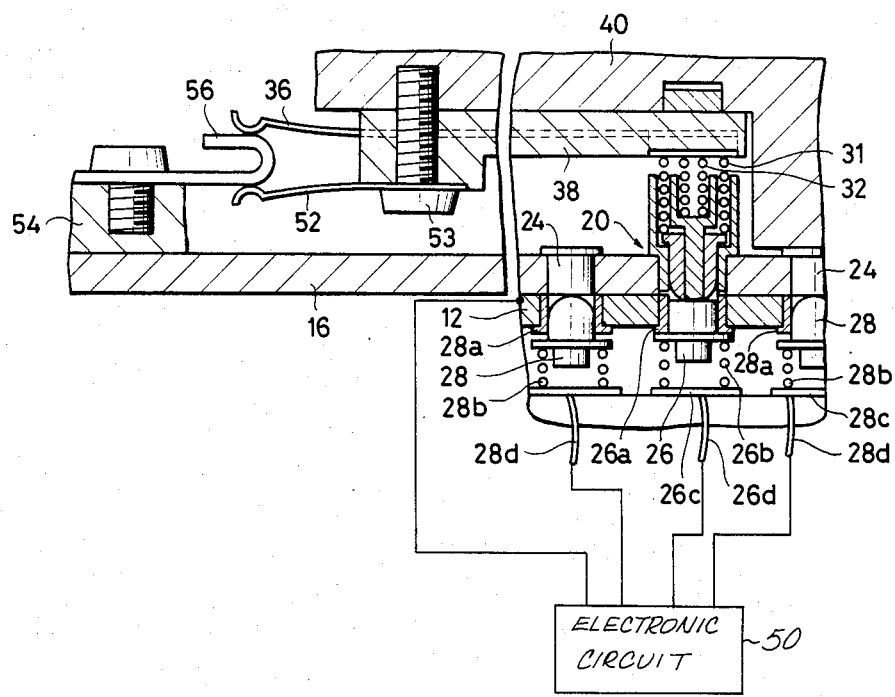

ELECTRIC CONTACT ARRANGEMENT FOR INDIVIDUAL OBJECTIVES

BACKGROUND OF THE INVENTION

The present invention relates to an electric contact arrangement for individual objectives (lens assemblies) in a photographic camera of the interchangeable lens type.

Information processing in photographic cameras has recently been developed to higher and higher degrees so that information on the maximum diaphragm value and the minimum diaphragm value, information on selection of automatic diaphragm control or manual diaphragm adjustment, and information on the shortest distance as well as focusing detection signal or the like in an auto-focus system can be processed by an electronic circuit contained within a camera body. For transmission of such information to the electronic circuit contained within the camera body, it has already been proposed to embed electrical contacts in the objective mount and the body mount at mutually confronting positions (e.g., U.S. Pat. No. 4,357,089, incorporated herein by reference). Such a structure is well known also from Japanese Patent Application Unexamined Disclosure Gazette No. 54-88122, Japanese Patent Application Unexamined Disclosure Gazette No. 50-67650, Japanese Patent No. 51-44652 and Japanese Patent Application Unexamined Disclosure Gazette No. 52-56926, the disclosures of which are incorporated herein by reference.

However, in these paired, aligned electric contacts of the prior art, one contact of each pair is biased to project in the perpendicular direction from the surface of the associated mount and the other contact of each pair is fixed on or in the associated mount so that only a point contact is established between the aligned contacts upon coupling the objective to the camera body. In consequence, there is a problem in the reliability of electric conduction established between these contacts. More specifically, there will often occur unreliable contact when insulative substance from the environment clings between the paired aligned contacts or insulative film is formed on the contact surface.

The insulative substances from the environment such as dust, sand or fiber will not be a serious problem insofar as such a substance has a size substantially smaller than the irregularity present on each contact surface. It is also possible to visually recognize such extraneous matter when the electric contacts are exposed and said extraneous matter is relatively large in size. Furthermore, such problem can be avoided by previously activating a member for removal of such extraneous matter (see U.S. Patent application Ser. No. 692,370, filed on January 18, 1985, the disclosure of which is incorporated herein by reference.

To the contrary, the problem of the surface film is more serious. Specifically, formation of film such as oxide film and sulfide film on the electric contact surface increases the contact resistance between the paired, aligned electric contacts, particularly when the contact pressure is low between these electric contacts. With the contact resistance thus increased, the signal to be transmitted will be accompanied by a transmission error at a minute voltage or current, or sometimes the transmission itself will be impossible. With surface film as thin as less than several tens of angstroms, the tunnel effect maintains conductivity. However, the surface film will exhibit an insulative property or the behavior of a high-resistance semiconductor, as the film grows beyond 100 angstroms.

As a means to solve such a problem, it is well known to plate the electric contacts with material which is resistant to air pollution to prevent development or growth of such surface film. Nevertheless, the desired pollution resistance is often not achieved because of pin holes in the plating layer.

This problem of surface film has a significant influence not only upon the pair of photographing mode indication contacts to transmit whether a photographer has selected the automatic diaphragm control mode or the manual diaphragm adjustment mode, as a desired photographing mode to the electronic circuit contained within the camera body, but also upon the pairs of diaphragm value information contacts serving to transmit specific diaphragm values, such as the maximum diaphragm value and the minimum diaphragm value to the electronic circuit.

Concerning the changeover member arranged within the objective for selection of the photographing modes, Japanese Utility Model Application Unexamined Disclosure Gazette No. 56-126627 discloses a changeover contact strip which is movable into contact with the electrically conductive objective mount. The changeover member proposed by this prior application has a problem with respect to reliable electric conduction, since grease used for smooth movement of rotational members within the lens barrel may cling to the contact area and serve as an insulator. According to this unexamined application, the changeover member is contained within the lens barrel and, accordingly, it would be difficult for a user to clean the surface of this changeover member unless there is provided suitable means for removal of clinging grease.

SUMMARY OF THE INVENTION

According to the invention, a lens for a photographic camera adapted to be mounted on a camera body, has a lens barrel, a lens mount secured on the lens barrel, and at least one contact for transmitting information to the camera body. The contact has first and second contiguous portions independently movable into and out of the lens mount. A first spring urges the first portion of the contact out of the lens mount. A second spring independent of the first spring urges the second portion of the contact out of the lens mount. Preferably, the first portion of the contact is a hollow cylinder, the second portion of the contact fits in the hollow of the first portion, and the ends of the first and second portions facing away from the lens mount are both convex and smoothly continuous at their convex ends. As a result of this construction, a more reliable electrical connection is made between the described contact and another contact on the camera body, even when insulative substances cling to the contact surfaces or surface film is formed thereon. The double contact structure reduces the probability of a poor electrical connection by a factor of a power of 2, e.g., if the probability of a poor electrical connection for a single contact structure is 1/1000, then the probability of a poor electrical connection for the double contact structure is 1/1,000,000.

BRIEF DESCRIPTION OF THE DRAWINGS

The features of specific embodiments of the best mode contemplated of carrying out the invention are illustrated in the drawings, in which:

FIG. 1 is a front view of a camera body and a back view of an interchangeable lens to be mounted on the camera body;

FIG. 2 is a side-sectional view of a portion of the lens of FIG. 1 illustrating the photographing mode contact with a double contact structure;

FIG. 3 is a side-sectional view of the portion of the lens shown in FIG. 2 and the corresponding portion of the camera body of FIG. 1 illustrating the photoghraphing mode contacts making electrical connection in alignment with each other;

FIG. 4 is a sectional view of the camera body and lens of FIG. 1 taken along a cylindrical section concentric with the axis of the lens mount and the camera mount of FIG. 1 showing the circumferentially arranged contacts on the camera body and lens as they lay in the same plane. This figure illustrates the invention as applied to the photographing mode contact pairs during the process of mounting the lens on the camera body; and FIG. 5 illustrates the same view of the camera body and lens as FIG. 4 after the lens has been fully mounted on the camera body and the contact pairs are aligned with each other;

DETAILED DESCRIPTION OF THE SPECIFIC EMBODIMENTS

Figure 6:
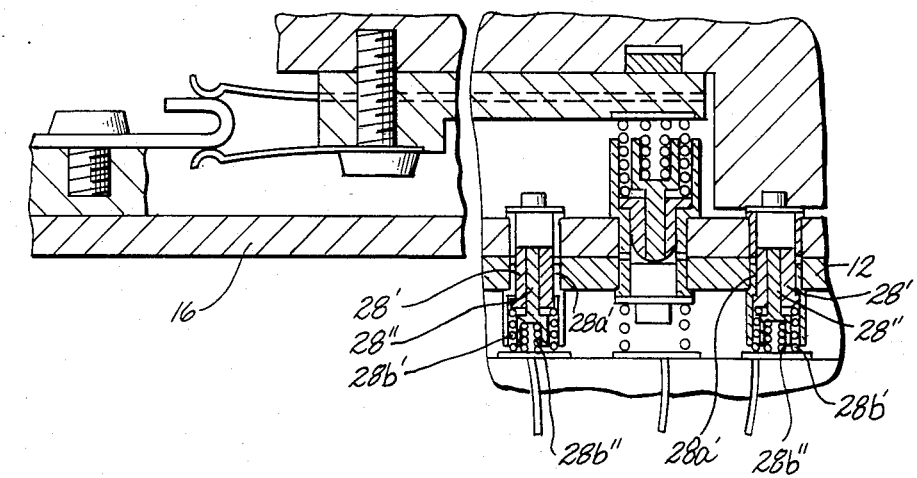
FIG. 6 illustrates the double contact structure of the invention as applied to the diaphragm value contacts as well as the photographing mode contacts.

FIG. 1 shows a photographic camera having mounts respectively provided with electric contacts, as a combination of a front view of a camera body mount with a rear view of a corresponding objective mount. FIGS. 2 and 3 show a photographing mode indicating electric contact means embodying the present invention with respect to the component arranged in the objective mount, this contact means serving to indicate selection of changeover of the automatic diaphragm control photographing mode and the manual diaphragm adjustment photographing mode. FIG. 2 is a sectional view taken through the optical axis of the objective as a single unit while FIG. 3 is a similar sectional view but as said objective having been coupled to the camera body.

Referring to FIG. 1, a body mount 12 of electrically conductive material is fixed by screws 13 integrally to the camera body 11 and an objective (lens) mount 16 also of electrically conductive material is secured by screws 17 integrally to a lens barrel 15 of an interchangeable lens.

The objective mount 16 is provided in its end surface with an electric contact 20 adapted to indicate whether the user has selected the automatic diaphragm control photographing mode or the manual diaphragm adjustment photographing mode and one or more electric contacts 24 adapted for transmission of this objective's specific diaphragm value, i.e., the maximum diaphragm value and the minimum diaphragm value. The former electric contact 20 for indication of the photographing modes is spring biased to project from the end surface of the mount 16. The latter electric contacts 24 are stationarily fixed in the mount 16 behind its end surface in the form of a button of insulation or electrically conductive material, which is recessed from said end surface. The insulation can be air, in which case a contact 24 comprises a recess. If a contact 24 is conductive material, it can comprise the mount itself. See co-pending U.S. Patent application Ser. No. 692,370, filed on Jan. 18, 1985, the disclosure of which is incorporated fully herein by reference.

The camera body mount 12 is provided with an electric contact 26 in its end surface at a position confronting, i.e., aligned with, the electric contact 20 arranged in the objective mount 16 for indication of the photographing modes and with electric contacts 28 at positions respectively confronting, i.e., aligned with, the electric contacts 24 for transmission of information on the specific diaphragm values of individual objectives. The former electric contact 26 for indication of the photographing modes is formed by an electric conductor which is insulated from the body mount 12 and arranged therein behind the end surface of the mount 12, as best seen in FIG. 3. The latter electric contacts 28 for diaphragm information are insulated from the body mount 12 and spring biased to project from the end surface of the mount 12, as seen in FIGS. 4 and 5.

The lens barrel 15 is coupled by a bayonet connection to the camera body 11 in a well-known manner and at a final stage of such coupling operation a lock pin 14 biased to project from the body mount 12 engages a corresponding lock groove 18 formed in the objective mount 16 so as to lock the lens barrel 15 in place. In this state, the respective electric contacts 26,28 arranged in the body mount 12 confront the associated electric contacts 20,24 arranged in the objective mount 16. Reference numeral 19 designates a diaphragm adjustment ring.

FIG. 2 shows the photographing mode indicating electric contact means 20 arranged in the objective mount as an embodiment of the present invention. Said electric contact means 20 comprises as components an outer contact 21 in the shape of a hollow cylinder and an inner contact 22 snugly inserted into a hollow portion of said outer contact 21, these inner and outer contacts being contiguous and independently biased by respective springs 31,32 outwardly with respect to the objective mount 16. An insulative collar 34 is interposed between said outer contact 21 and said objective mount 16. Such collar 34 will be unnecessary when the mount 16 is electrically insulative. The outer contact 21 is slidable relative to the collar 34 while the inner contact 22 is slidable relative to the outer contact 21. To prevent any extraneous matter from entering between the outer contact 21 and the inner contact 22, it is preferred that the outer contact 21 and the inner contact 22 should have respective end surfaces smoothly continuous with each other when said assembled contacts 21,22 project fully forward and both contacts should be convex.

Preferably, a tail portion of the inner contact 22 is shaped into a cylinder having a hollow portion so that the spring 32 may be centrally disposed and captured within said hollow portion and the spring 31 may be located around said cylinder. A tail portion of the insulative collar 34 is preferably shaped also into a cylinder having a hollow annular portion in which the tail portion of said inner contact 22 as well as both the springs 31,32 may be accommodated, i.e., captured. In this way, any possible interference between the springs 31,32 is eliminated and incorporation of the outer contact 21 and the inner contact 22 into the collar 34 is facilitated.

Both the spring 31 biasing the outer contact 21 outwardly and the spring 32 biasing the inner contact 22 outwardly are electrically conductive and electrically connected at the side opposite to said outer contact 21 and the inner contact 22 to a changeover contact strip 36 of electrically conductive material. Except a portion adapted to come in contact with said springs 31,32. Said changeover contact strip 36 is embedded, in an insulative plate 38 which is, in turn, fixed to a joint ring 40 fixedly disposed within the lens barrel 15. Said joint ring 40 is of electrically conductive material and electrically connected to the objective mount 16.

The photographing mode indicating electric contact means 26 arranged in the camera body mount is electrically insulated from said body mount 12 by an insulative collar 26a and comprises an electric conductor fixed in said mount 12 behind the end surface thereof Said electric contact means 26 is connected by a conductive spring 26b to a base plate 26c fixed to the body and said base plate 26c is connected by a lead wire 26d to an electronic circuit 50 contained within the camera body.

FIGS. 4 and 5 are sectional views showing the body mount 12 and the objective mount 16 as circumferentially developed around the optical axis. FIG. 4 shows the objective brought by the diaphragm adjustment ring 19 into the manual diaphragm adjustment mode and being coupled to the camera body. FIG. 5 shows the objective having been completely coupled to the camera body and brought by the diaphragm adjustment ring 19 into the automatic diaphragm control mode.

As shown by FIGS. 4 and 5, a first contact strip 36 electrically connected by the springs 31,32 to the photographing mode indicating electric contact means 20 (comprising the outer contact 21 and the inner contact 22) extends circumferentially about the optical axis of the objective and is exposed from the insulative plate 38 serving as a support for said first contact strip 36. Said insulative plate 38 is further provided adjacent said exposed first contact strip 36 with an electrically conductive second contact strip 52 fixed thereon. Screw 53 serves to secure said contact strips 52 and said insulative plate 38 integrally to the joint ring 40 by pressing through a hole in strip 36 and thereby the second contact strip 52 is electrically connected to said joint ring 40 without connecting first strip 36 thereto. Said joint ring 40 is electrically connected to the objective mount 16, so that said second contact strip 52 is also electrically connected to said objective mount 16. As will be apparent from FIGS. 4 and 5, both the first contact strip 36 and the second contact strip 52 have their front ends which are concave.

Referring to FIGS. 4 and 5, reference numeral 54 designates an electrically insulative changeover member which may be the diaphragm adjustment ring 19 or a member movable integrally with said ring 19. An electrically conductive third contact strip 56 having a front end larger than the spacing between the first contact strip 36 and the second contact strip 52 is fixed to said changeover member 54. The changeover member 54 and the third contact strip 56 are so arranged that the third contact strip 56 is spaced from both the first contact strip 36 and the second contact strip 52 when the diaphragm adjustment ring 19 has been set to the manual diaphragm adjustment position while said third contact strip 56 slides along both the first contact strip 36 and the second contact strip 52 and thereby establishes an electric conduction between said first contact strip 36 and said second contact strip 52 when the diaphragm adjustment ring 19 has been set to the automatic diaphragm control position.

FIG. 4 corresponds to a state in which one of the diaphragm value transmission electric contacts 28 arranged in the camera body mount confronts the photographing mode indicating electric contact means 20 arranged in the objective mount during operation of coupling the objective to the camera body. As shown, the diaphragm information contacts 28 of the body mount are insulated from the body mount 12 by an insulative collar 28a and biased by a spring 28b to project outward beyond the end surface of said mount 12. Said springs 28b are electrically conductive and connected by base plates 28c and lead wire 28d to electronic circuit 50 contained within the camera body. Electronic circuit 50 could comprise the circuitry disclosed in U.S. Pat. No. 4,477,161 issued on October 16, 1984, the disclosure of which is incorporated fully herein by reference.

In FIG. 6, diaphragm information transmitting contacts 28 also have a double structure, i.e., they are constructed as two contiguious independently movable portions, namely, an outer contact 28'in the shape of a hollow cylinder and an inner contact 28" snugly inserted into the hollow portion of contact 28'. The outer and inner contacts are contiguous and independently biased by respective springs 28b' and 28b". An insulative collar 28a' is interposed between outer contact 28' and the camera body mount 12. The outer contact 28' is slidable relative to collar 28a' while the inner contact 28" is slidable relative to the outer contact 28'. The tail portions of inner contact 28" and insulative collar 28a' are formed in the same manner as inner contact 22 and insulative collar 34 so as to capture the respective springs 28b' and 28b".

Now the action of the above-mentioned contact arrangement will be explained. In coupling of the objective to the camera body as shown by FIG. 4, i.e., in the manual diaphragm adjustment photographing mode, no electric conduction is established between the first contact strip 36 and the second contact strip 52 so that the photographing mode indicating electric contact means 20 arranged in the objective mount is in its opened state. The outer contact 21 and the inner contact 22 constituting said photographing mode indicating electric contact means 20 first come into contact with the body mount 12 and the diaphragm information transmitting electric contacts 28 arranged in said body mount during the operation of coupling, and said electric contact means 20 is finally brought into contact with the photographing mode indicating electric contact 26 arranged in the body mount behind the end surface of this mount. The diaphragm information transmitting electric contacts 28 of the camera body mount, on the other hand, come into contact with the objective mount 16, the photographing mode indication electric contact means 20 and the diaphragm information transmitting electric contacts 24 stationarily arranged in the objective mount 16 during the operation of said coupling, and finally confront the associated diaphragm information transmitting electric contacts 24. Upon completion of the coupling of the objective to the camera body, the lock pin 14 arranged in the camera body engages the lock groove 18 formed in the objective so as to lock the objective to the camera body. In such locked state, the electric contacts of the respective pairs mutually confront each other as shown in FIGS. 3 and 5.

When the diaphragm adjustment ring 19 is rotated to change over the objective from the diaphragm manual adjustment mode to the automatic diaphragm control mode after completion of coupling the objective to the camera body, a state as shown by FIG. 5 is achieved. Namely, the third contact strip 56 is interposed between the first contact strip 36 and the second contact strip 52 to establish an electric conduction between said first contact strip 36 and said second contact strip 52 so that the photographing mode indicating electric contact means 20 of the objective mount is electrically connected via the joint ring 40 to the objective mount 16. In consequence, the automatic diaphragm control mode is indicated via the photographing mode indicating electric contact means 26 arranged in the body mount to the electronic circuit 50 contained within the camera body, and simultaneously reading of specific diaphragm value information of this objective is instructed to the electric circuit. The third contact strip 56 snugly slides along respective surfaces of the first contact strip 36 and the second contact strip 54 and, therefore, no failure of electrical contact occurs even when extraneous insulative substances cling to these contact strips or film formation occurs on their surfaces.

In coupling of the objective to the camera body in the automatic diaphragm control mode, the first contact strip 36 and the second contact strip 52 are kept in electric conductive relationship by the third contact strip 56. Both the objective mount 16 and the diaphragm value information transmitting electric contact 24 arranged therein are never brought into contact with the photographing mode indicating electric contact means 26 of the body mount during the coupling operation, since the electric contact means 26 is arranged in the body mount 12 behind the end surface thereof. Accordingly, there is no danger that erroneous diaphragm information is transmitted to the electronic circuit 50 contained within the camera body even when the diaphragm value information transmitting electric contacts 28 come into contact with the objective mount 16 or non-associated diaphragm value information transmitting electric contacts 24 arranged therein. Upon completion of coupling the objective to the camera body, the photographing mode indicating electric contact means 20 arranged in the objective mount is in contact with the photographing mode indicating electric contact means 26 of the camera body mount and reading of specific diaphragm values of this objective is instructed to the electronic circuit 50 contained within the camera body.

Figure 7:
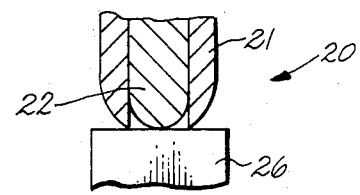
FIG. 7 is an enlargement of a portion of FIG. 3 showing the double contact structure bearing against the confronting contact on the camera mount.

It has been possible to remove any insulative extraneous matter clinging to the electric contacts arranged in or on the mounts to the extent extraneous matter is sufficiently large to be visually detected. However, even the detection of such extraneous matter has been difficult when it takes the form of fine "dust," "oxide film," "sulfide film," etc. Furthermore, it could become quite burdensome if the cleaning of the contacts were to be done by the user. In view of such inconvenience, the present invention provides the contact of a double structure normally biased to project outwards so that the area over which each contact comes in contact with the associated contact may be increased and thereby the reliability of electric conduction may be improved. Assuming the confronting contact has a flat surface, the inner contact portion will be pushed back against the corresponding spring more than the outer contact portion, thereby creating contact between the confronting contact surface and both the inner and outer contact portions of the double structure contact, as illustrated in the enlargement of FIG. 7.

Said double structure also functions to remove any foreign matter possibly clinging to the contact surfaces, i.e., said foreign matter is automatically removed as the objective is coupled to the camera body. This feature leads to a substantial reduction of the user's burden.

Although at present a contact structure having two independently movable spring biased portions is preferred, the structure could have three or more of said portions.

Concerning the contact strips arranged within the lens barrel to indicate changeover between the automatic diaphragm control photographing mode and the manual diaphragm adjustment photographing mode, the present invention provides an advantageous effect in that these contact strips slidably contact one another as the user operates the changeover to select the automatic diaphragm control photographing mode. As a result, the contact strips automatically become free of any extraneous insulative substances, i.e., these strips are cleaned without being noticed by the user. The arrangement to achieve such an effect can be obtained by a small space which is available within the objective mount and additionally it is also possible to mold the first contact strip and the second contact strip as a single piece. Thus, a compact arrangement useful for various interchangeable objectives is obtained and the manufacturing cost per piece can be substantially reduced by mass-production. The contacting surfaces are always maintained clean by normal operation of the objective and this feature makes costly processing such as gold plating unnecessary.

The attached Japanese language specification, Appendix A, the priority of which is claimed for the present application is incorporated fully herein by reference.

What is claimed is:

1. A lens for a photographic camera adapted to be interchangeably mounted on a camera body, the lens comprising:
   a lens barrel;
   a lens mount secured on the lens barrel;
   a contact for transmitting information to the camera body, the contact having first and second contiguous portions independently movable into and out of the lens mount;
   first spring means for urging the first portion of the contact out of the lens mount; and
   second spring means independent of the first spring means for urging the second portion of the contact out of the lens mount.

2. The lens of claim 1, in which the first portion of the contact is a hollow cylinder and the second portion of the contact fits in the hollow of the first portion.

3. The lens of claim 2, in which the ends of the first and second portions facing away from the lens mount are convex.

4. The lens of claim 3, in which the first and second portions are smoothly continuous at their convex ends.

5. The lens of claim 4, additionally comprising an insulative collar disposed between the lens barrel and the contact, a first tail portion having a cylindrical cavity on the second portion of the contact within the lens barrel, and a second tail portion on the insulative collar within the lens barrel forming an annular cavity with the first tail portion, the first spring means comprising a coil spring, one end of which is disposed in and captured by the annular cavity, and the second spring means comprising a coil spring, one end of which is disposed in and captured by the cylindrical cavity.

6. The lens of claim 5, in which the first portion of the contact has an annular flange on its interior end, the second tail portion forms with the remainder of the insulative collar a shoulder that serves with the flange on the first portion of the contact as a stop on the motion of the first portion out of the lens mount, and the first tail portion forms with the remainder of the second portion of the contact a shoulder to serve with the first portion of the contact as a stop on the motion of the second portion of the contact out of the lens mount.

7. The lens of claim 6, in which the lens mount is electrically conductive the lens, additionally comprising:
 a changeover member movable between a first position which represents automatic photographing mode and a second position which represents manual photographing mode;
 a first stationary contact strip electrically connected to the contact;
 a second stationary contact strip confronting the first contact strip in spaced apart relationship therefrom;
 means for electrically connecting the second contact strip to the lens mount; and
 a third contact strip secured to the changeover member to interconnect the first and second contact strips in the first position.

8. The lens of claim 1, in which the lens mount is electrically conductive, the lens additionally comprising:
 a changeover member movable between a first position representative of automatic photographing mode and a second position representative of manual photographing mode;
 means for electrically connecting the contact to the lens mount in one position of the changeover member; and
 means for disconnecting the contact from the lens mount in the other position of the changeover member.

9. In a camera having a camera body member and an interchangeable lens member engageable with the camera body member, the improvement comprising:
 a lens mount on the lens member having a first flat surface;
 a camera mount on the camera body member engaging the lens mount to join the lens member to the camera body member, the camera mount having a second flat surface abutting the first flat surface when the lens mount engages the camera mount;
 a first electrical contact in one member for transmitting information to the other member, the first contact having first and second contiguous portions independently movable into and out of the mount of the one member;
 first spring means for urging the first portion of the contact out of the mount of the one member;
 second springs means independent of the first spring means for urging the second portion of the contact out of the mount of the one member; and
 a stationary second electrical contact in the other member opening toward the surface of the mount of the other member without protruding therefrom in alignment with the first contact when the lens mount engages the camera mount so the first contact normally bears against the second contact.

10. The improvement of claim 9, in which the first portion of the contact is a hollow cylinder and the second portion of the contact fits in the hollow of the first portion.

11. The improvement of claim 9, in which the ends of the first and second portions facing away from the lens mount are convex.

12. The improvement of claim 9, in which the first and second portions are smoothly continuous at their convex ends.

13. The improvement of claim 9, in which the one member is the lens member, the other member is the camera body member, and the camera additionally comprises:
 a plurality of third contacts in the camera mount movable normal to the second surface between a retracted position approximately flush with the second surface and an extended position projecting from the second surface;
 spring means for urging the third contacts toward the extended position; and
 one or more stationary contacts in the lens mount opening toward the first surface without protruding therefrom in alignment with the one or more third contacts so the one or more third contacts bear against the respective one or more stationary contacts when the lens mount engages the camera mount, the one or more stationary contacts being insulative.

14. The improvement of claim 13, in which the mounts are electrically conductive, the improvement additionally comprising:
 a changeover member movable between a first position which represents automatic photographing mode and a second position which represents manual photographing mode;
 a first stationary contact strip electrically connected to the contact;
 a second stationary contact strip confronting the first contact strip in spaced apart relationship therefrom;
 means for electrically connecting the second contact strip to the lens mount; and
 a third contact strip secured to the changeover member to interconnect the first and second contact strips in the first position.

15. The improvement of claim 9, in which the one member is the camera body member, the other member is the lens member, and the camera additionally comprises:
 a third electrical contact in the lens mount movable normal to the first surface between a retracted position approximately flush with the first surface and an extended position projecting from the third surface;
 spring means for urging the third contact toward the extended position;
 a stationary fourth electrical contact in the camera mount opening toward the second surface without protruding therefrom in alignment with the third contact when the lens mount engages the camera mount so the first contact normally bears against the second contact; and
 a plurality of other contacts in the camera body member constructed in the same manner as the first contact and a plurality of other contacts in the lens member constructed in the same manner as the second contact.

* * * * *